(12) United States Patent
Suh et al.

(10) Patent No.: US 7,450,582 B2
(45) Date of Patent: Nov. 11, 2008

(54) METHOD FOR CALCULATING HOP COUNT OF MOBILE IP IN AN IP NETWORK

(75) Inventors: Kyung-Joo Suh, Suwon-shi (KR);
Young-Joo Suh, Pohang-shi (KR);
Dong-Hee Kwon, Pohang-shi (KR);
Kil-Suk Yang, Pohang-shi (KR);
Jae-Myung Jang, Pohang-shi (KR)

(73) Assignee: Samsung Electronics Co., Ltd (KR)

( * ) Notice: Subject to any disclaimer, the term of this patent is extended or adjusted under 35 U.S.C. 154(b) by 790 days.

(21) Appl. No.: 10/781,437

(22) Filed: Feb. 17, 2004

(65) Prior Publication Data

US 2004/0160941 A1    Aug. 19, 2004

(30) Foreign Application Priority Data

Feb. 17, 2003    (KR) ..................... 10-2003-0009734

(51) Int. Cl.
*H04L 12/28* (2006.01)
*H04L 12/56* (2006.01)
*H04J 3/24* (2006.01)
*H04Q 7/00* (2006.01)

(52) U.S. Cl. .................. 370/392; 370/331; 370/349; 455/436

(58) Field of Classification Search ......... 370/237–338, 370/349–392, 401–408; 455/432–436; 709/238–242
See application file for complete search history.

(56) References Cited

U.S. PATENT DOCUMENTS

| | | | |
|---|---|---|---|
| 6,147,971 A * | 11/2000 | Rochberger et al. | 370/238 |
| 6,501,756 B1 * | 12/2002 | Katsube et al. | 370/392 |
| 6,556,543 B1 * | 4/2003 | Park et al. | 370/255 |
| 6,606,318 B2 * | 8/2003 | Katsube et al. | 370/392 |
| 6,608,833 B2 * | 8/2003 | Katsube et al. | 370/392 |
| 6,947,401 B2 * | 9/2005 | El-Malki et al. | 370/331 |
| 2002/0159478 A1 * | 10/2002 | Watanuki et al. | 370/466 |
| 2002/0186679 A1 * | 12/2002 | Nakatsugawa et al. | 370/349 |
| 2003/0174652 A1 * | 9/2003 | Ebata | 370/235 |
| 2004/0039831 A1 * | 2/2004 | Grimminger | 709/230 |
| 2004/0105408 A1 * | 6/2004 | Suh et al. | 370/331 |
| 2004/0143842 A1 * | 7/2004 | Joshi | 725/32 |
| 2005/0020265 A1 * | 1/2005 | Funabiki et al. | 455/436 |

\* cited by examiner

*Primary Examiner*—Man Phan
(74) *Attorney, Agent, or Firm*—The Farrell Law Firm, PC (57) ABSTRACT

Disclosed is a method for calculating a routing cost or a hop count of a mobile IP (Internet Protocol) in an IP network. The IP network can communicate with the MN having a mobile IP and includes a plurality of access routers. If the MN moves to a new access router, the MN generates a distance measurement request message and transmits the generated distance measurement request message to an access router serving as a regional anchor point (RAP) of the MN. Upon receiving the distance measurement request message, the access router serving as the RAP generates an acknowledgement message having an initial hop limit field value and a hop limit value, and transmits the acknowledgement message. The MN calculates a hop count using the initial hop limit field value and the hop limit value.

18 Claims, 7 Drawing Sheets

FIG.8

METHOD FOR CALCULATING HOP COUNT OF MOBILE IP IN AN IP NETWORK

PRIORITY

This application claims priority under 35 U.S.C. § 119 to an application entitled "Method for Calculating Hop Count of Mobile IP in an IP Network" filed in the Korean Intellectual Property Office on Feb. 17, 2003 and assigned Ser. No. 2003-9734, the contents of which are incorporated herein by reference.

BACKGROUND OF THE INVENTION

1. Field of the Invention

The present invention relates generally to a Mobile IP network, and in particular, to a method for defining a cost function and calculating a cost factor, especially hop count in a Mobile IP network.

2. Description of the Related Art

Recently, Internet Protocol (IP) networks have been rapidly developed owing to the rapid progress of Internet technology. In such an IP network, each user and a particular server operate with a fixed address, or an IP address, and routing is performed based on such address.

Meanwhile, in order to provide more data to mobile nodes (MNs) in a mobile communication system, various technologies have been proposed. As one of such technologies, the so-called Mobile IP technology for assigning an IP address to a MN has been introduced. Regarding the Mobile IP, many discussions are taking place in the Internet Engineering Task Force (IETF) and research is currently being conducted on the Mobile IP version 6 (Mobile IP v6) protocol.

In a Mobile IP system, the definition of a cost function is very important for IP routing. The cost function becomes a very important factor for message routing in a communication system using not only Mobile IP but also general IP. However, in MIP v6, which is currently being actively researched, the cost function, which is a very important factor for determining routing, has not been defined yet. That is, up to now there is no method for correctly transferring desired traffic data to a MN using Mobile IP.

SUMMARY OF THE INVENTION

It is, therefore, an object of the present invention to provide a method for calculating a cost function of Mobile IP in an IP network.

It is another object of the present invention to provide a method for routing traffic data in an IP network.

It is further another object of the present invention to provide a method for calculating a cost function for Mobile IP v6 in an IP network.

It is yet another object of the present invention to provide a method for calculating a hop count for Mobile IP v6 in an IP network, to correctly and safely transfer traffic data to a mobile node (MN).

In accordance with one aspect of the present invention, there is provided a method for calculating a cost of a mobile node (MN) in an Internet Protocol (IP) network capable of communicating with the MN having a mobile IP and including a plurality of access routers. The method comprises the steps of: if the MN moves to a new access router, generating by the MN a distance measurement request message including an initial hop limit field value and a hop limit value and transmitting to an access router serving as a regional anchor point (RAP) of the MN the generated distance measurement request message, and upon receiving the distance measurement request message, calculating, by the access router serving as the RAP, a hop count using the initial hop limit field value and the hop limit value, and sending to the MN the calculated hop count as an acknowledgement signal.

In accordance with another aspect of the present invention, there is provided a method for calculating a cost of a mobile node (MN) in an Internet Protocol (IP) network capable of communicating with the MN having a mobile IP, and including a plurality of access routers. The method comprises the steps of: if the MN moves to a new access router, generating by the MN a distance measurement request message and transmitting to an access router serving as a regional anchor point (RAP) of the MN the generated distance measurement request message; upon receiving the distance measurement request message, generating by the access router serving as the RAP an acknowledgement message having an initial hop limit field value and a hop limit value, and transmitting the acknowledgement message; and calculating by the MN a hop count using the initial hop limit field value and the hop limit value.

In accordance with a further aspect of the present invention, there is provided a method for calculating a cost of a mobile node (MN) in an Internet Protocol (IP) network capable of communicating with the MN having a mobile IP and including a plurality of access routers. The method comprising the steps of: if the MN moves to a new access router generating by the MN a distance measurement request message including an initial hop limit field value and a hop limit value and transmitting to an access router serving as a regional anchor point (RAP) of the MN the generated distance measurement request message; upon receiving the distance measurement request message, calculating by the access router serving as the RAP a hop count using the initial hop limit field value and the hop limit value, and delivering the calculated hop count to the MN as an acknowledgement signal; upon receiving the distance measurement request message, generating by the access router serving as the RAP, a distance measurement message including an initial hop limit field value and a hop limit value, and transmitting the generated distance measurement message; and calculating by the MN a hop count using the initial hop limit field value and the hop limit value, and receiving a measured hop count from the access router serving as the RAP.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Various routing protocols used for IP routing are different from one another not only in metric factor defined for each cost function but also in a process of calculating a cost. Therefore, the present invention provides a method for defining a cost function for Mobile IP routing, defining metric factors affecting the cost function, and measuring a hop count among them. In the present invention, based on a factor affecting path determination, i.e., a metric factor, a value for a corresponding path is calculated, in the following description this value will be referred to as "cost" or "metric." One of the factors used as a hop forwarding criterion in a routing operation is cost, a path with low cost is preferred.

According to the present invention, constraints of such metric factors as Hop count, Reliability, Bandwidth, and Delay are satisfied as stated below.

(1) Hop count ( )<=Hop count constraint
(2) Reliability ( )>=Reliability constraint
(3) Bandwidth ( )>=Bandwidth constraint
(4) Delay ( )<=Delay constraint Among the 4 factors, a first factor of Hop count ( ) is a result value of a distance measured from a mobile node (MN) to a regional anchor point (RAP), a cost function is satisfied only when this value is smaller than or equal to a Hop count constraint value. A second factor of Reliability ( ) is a value determined by measuring reliability of a path from a MN to a RAP, a cost function is satisfied only when this value is larger than or equal to a Reliability constraint value. A third factor of Delay ( ) is a value determined by measuring a delay of a path from a MN to a RAP, a cost function is satisfied only when this value is smaller than or equal to a Delay constraint value. Finally, a fourth factor of Bandwidth ( ) is a value determined by measuring a maximum available bandwidth from a MN to a RAP, this value must be larger than or equal to a Bandwidth constraint requested by a MN. If all nodes have sufficient resources for such factors, an optimized link satisfying such constraints between the nodes can be selected. Selecting an optimized constraint value from the factors according to a traffic characteristic and a network topology is very important. In the present invention, the description will be concentrated upon a hop count among the factors affecting the cost.

Figure 1:
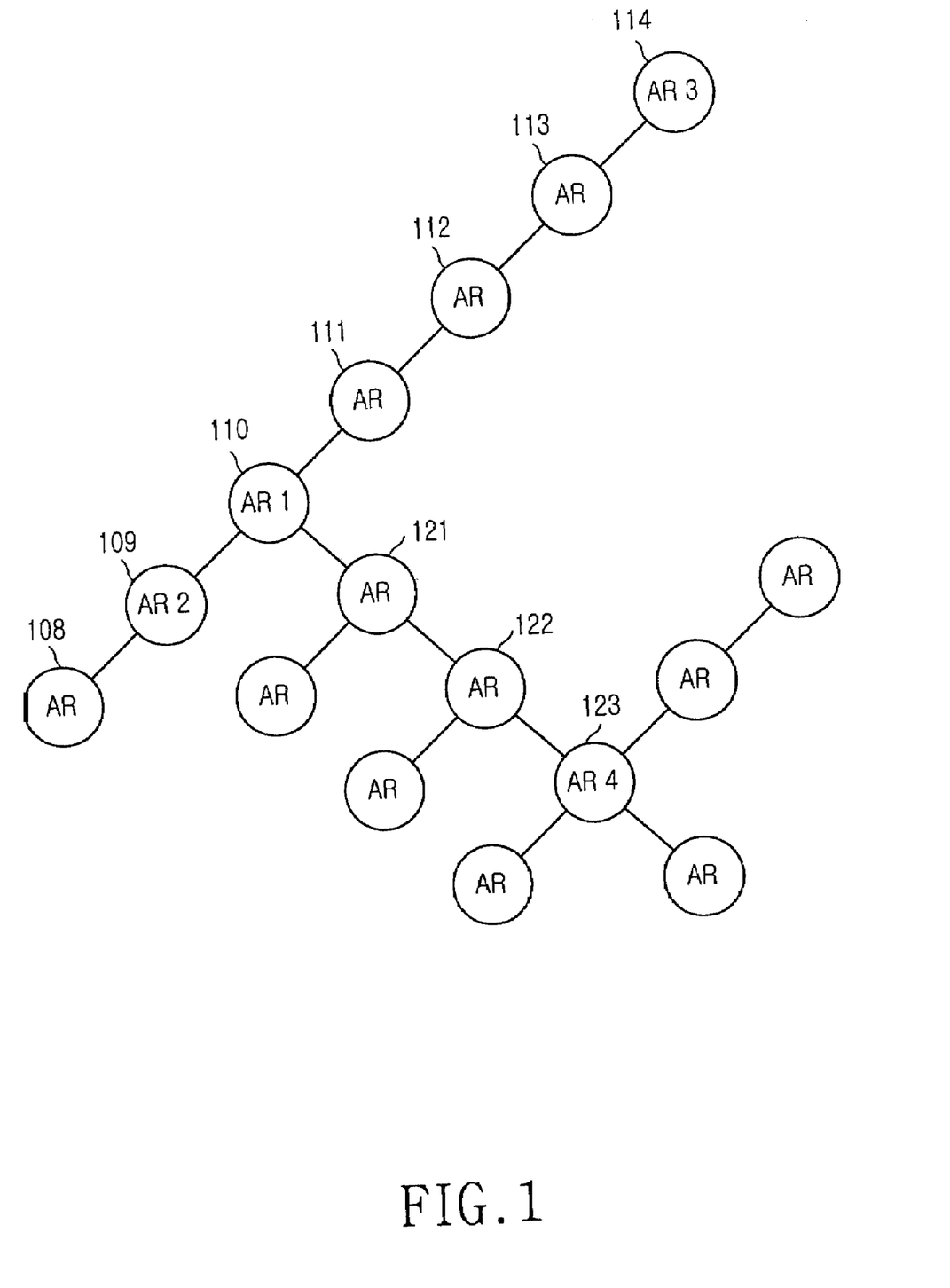
FIG. 1 is a diagram illustrating an example of a network topology comprised of routers in an IP network according to an embodiment of the present invention.

FIG. 1 is a diagram illustrating an example of a network topology, comprised of routers in an IP network according to an embodiment of the present invention. With reference to FIG. 1, a description will now be made of a method for calculating a cost and a hop count according to an embodiment of the present invention.

In FIG. 1, there are illustrated a plurality of access routers (ARs) which are nodes constituting an IP network. In addition, it should be noted that reference numerals are given only to necessary routers, for the convenience of explanation. Each access router, illustrated in FIG. 1, becomes a specific node of an IP network, which can provide traffic service to a MN having an assigned mobile IP address according to an embodiment of the present invention. In the IP network, the access routers serving as nodes perform data processing according to an IP v6 basic header. Such an IP v6 basic header is illustrated in Table 1 below.

TABLE 1

| Version (4 bits) | Traffic Class (8 bits) | Flow Label (20 bits) | |
|---|---|---|---|
| Payload Length (16 bits) | | Next Header (8 bits) | Hop limit (8 bits) |
| Source Address (128 bits) | | | |
| Destination Address (128 bits) | | | |

As illustrated in Table 1, the header provided in the IP v6 standard includes 4-bit Version information, 8-bit Traffic Class information, 20-bit Flow Label information, 16-bit Payload Length information, 8-bit Next Header information, and 8-bit Hop Limit information. In addition, the header includes 128-bit Source Address information and 128-bit Destination Address information. As can be appreciated from Table 1, the Hop. Limit field information is included in the header. A distance limitation will now be described with reference to FIG. 1.

A term "distance limitation condition" refers to a limit on the number of access routers over which a MN can move, and this will be described in detail herein below. It is assumed that a MN is located in a service area of a first access router (AR1) 110 and the limited number of hops (or a hop count limit) is 3. Movement by a MN to a second access router (AR2) 109 that is adjacent to the AR1 110 is called one hop. Here, the term "hop" refers to a journey for which a data packet is sent from one router to another router in the network. In the following description the hop count limit means a value of the distance limitation condition. Therefore, if the hop count limit is 3, the MN does not violate the hop limit when it moves to the AR2 109 under the control of the AR1 110.

In addition, when a MN located in a service area of the AR1 110 moves to a fourth access router (AR4) 123, it moves over a total of 3 hops because the number of routers between the AR1 110 and the AR4 123 is 2. Even in this case, the MN does not violate the hop limit because the hop count is 3. However, when a MN located in a service area of the AR1 110 moves to a third access router (AR3) 114, it moves over a total of 4 hops because the number of routers between the AR1 110 and the AR3 114 is 3. Therefore, in this case, the MN violates the hop limit because the hop count exceeds the hop count limit.

Actually, however, a method for calculating a hop count in an IP network has not been provided. Therefore, when a MN moves with a hop count exceeding the hop count limit, routers cannot transfer traffic to the MN or transfer traffic to the MN in a very unstable state. A new method for calculating a hop count and performing a corresponding operation will now be described herein below.

Figure 2:
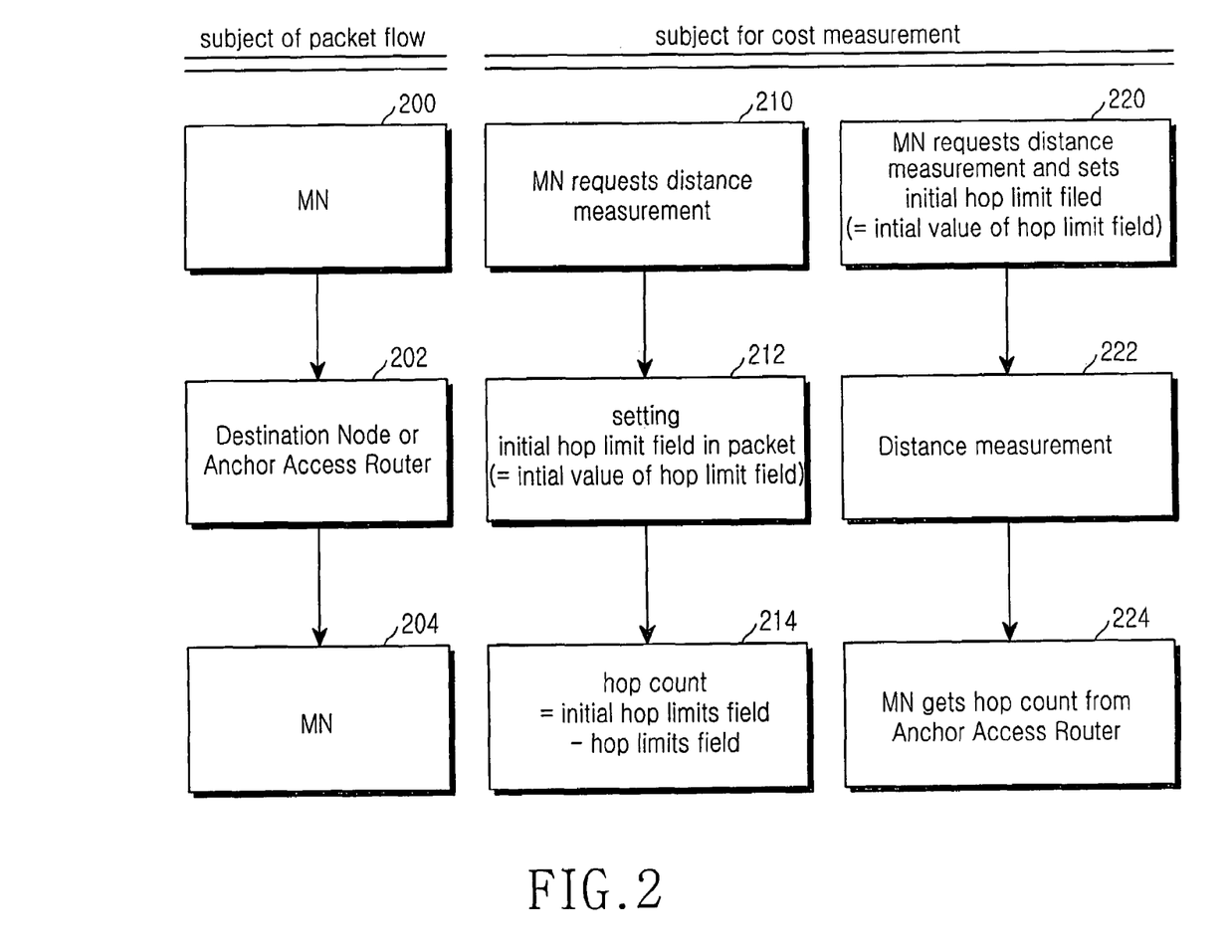
FIG. 2 is a flow diagram illustrating relations between subjects of packet flow and subjects for measuring a routing cost.

FIG. 2 is a flow diagram illustrating relations between subjects of packet flow and subjects for measuring a routing cost. With reference to FIG. 2, a detailed description will now be made of relations between subjects of packet flow and subjects for measuring a routing cost.

In FIG. 2, reference numerals 200, 210 and 220 denote processes performed when a MN sends a Mobile IP packet to a destination node. In this case, the destination node can be a correspondent node (CN), an access router (AR), or a regional anchor point (RAP). As denoted by the reference numeral 220, in order to send a distance measurement request message to a destination node or an anchor access router (or a regional anchor point) to request the destination node to measure a distance, a MN sets a value of an initial hop limit field to a hop limit value. If a value of an initial hop limit field is set in this way, distance measurement is available later on. This will be described below. A hop limit field is defined in an IP packet header as illustrated in Table 1, and has a value, which is decreased by one for every hop. An initial hop limit field value is an initial value set to a mobility option in a mobility header, and is not changed by transmission. The distance measurement request message can be illustrated by Table 2 below.

TABLE 2

| Payload protocol | Header Length | MH Type | Reserved |
|---|---|---|---|
| Checksum | | Sequence # | |
| A | Reserved | Mobility Option | |

The distance measurement request message illustrated in Table 2 includes the following fields. The message is used by designating a request for hop count measurement in a MH (Mobility Header) Type field of a mobility header. The mobility header designates a value of a header to be received after the current packet (To Be Determined by the Internet Assigned Numbers Authority (TBD by IANA)), and is used for binding creation or management-related messaging. In Table 2, a Payload protocol field is comprised of 8 bits and is used to designate a type of a header immediately following the mobility header. A Header Length field is an 8-bit unsigned integer and represents a mobility header length by the octet. In Table 2, it means the next octet excepting a first octet. The octet is defined as a multiple of 8 bits. For example, a 0-octet Header Length field means 0, a 1-octet Header Length field means 8 bits, a 2-octet Header Length field means 16 bits, and a 3-octet Header Length field means 24 bits. The mobility header is used when it is included in a message denoted by 1 in FIG. 3, a message denoted by 2 in FIG. 4, or a message denoted by 2 in FIG. 5 as a measurement request message. Next, the MH type field is comprised of 8 bits, and is defined to identify a mobility message. Herein, a value of 8 will be assigned for the distance measurement request message. A Sequence# field is a field for determining how many times a 16-bit unsigned integer has been received. Using the reception frequency of the message, a receiving node can determine how many times it has received a hop measurement request, and a sending node compares the reception frequency with the number of acknowledgements received. An A field is used when sending MN requests for an acknowledgment in response to a hop count measurement request. In addition, reserved fields are included in the message. As Mobility Option, included in the last field of the message of Table 2, an initial hop limit option is used.

The Mobility Option field can be configured as illustrated in Table 3 below.

TABLE 3

| Initial Hop Limit | Type = 7 | Length = 1 |
|---|---|---|

Table 3 defines a mobility option. As illustrated in Table 1, a hop limit field is an 8-bit field included in an IP v6 basic header and performs the same operation as an IP v4 TTL (Time-To-Live) field. Therefore, the hop limit field stores a value that decreases each time it passes through a router in a forward process. In contrast, an initial hop limit field illustrated in Table 3 is a field included in the Mobility Option field of a mobility header, and is used to represent an initial hop limit value. This field is stores an initial value set before a packet is being transmitted. In Table 3, an initial hop limit option among mobility options is defined as a type-length-value (TLV) format. An Option Type field, serving as an 8-bit identifier, is used to represent an initial hop limit among the mobility options, and its value is set to 7. An Option Length field, serving as an 8-bit unsigned integer, has an 8-bit (or 1-octet) value, and represents a length of an initial hop limit option. An initial hop limit value is stored as option data. By setting such an initial hop limit value, a hop count can be calculated depending on a difference between the initial hop limit value and a current hop limit value in an IP v6 header. This mobility option is used for a distance measurement request message and a distance measurement acknowledgement message.

As described above, if data is transmitted with the initial hop limit value illustrated in Table 3, a hop count can be calculated. Such a process will be described in detail herein below.

As shown in FIG. 2, between processes 200 and 202 and processes 202 and 204 there is included a process for setting, by an intermediate router, the hop limit field, described in Table 3, to '(previous hop limit field value)−1' and then transmitting a packet. That is a value of the hop limit field is decreased by one each time it passes through one router.

In addition, reference numerals 202, 212 and 222 denote processes performed in a destination node, i.e., an access router, a correspondent node, or an anchor access router (or a regional anchor point).

An embodiment of the present invention will be described based on the regional anchor point (RAP) as a destination node. A RAP sets an initial hop limit field value and then transmits a packet to a MN so that the MN can calculate a hop count. In an alternative manner, the RAP can also calculate a hop count. In this case, the RAP calculates a hop count using an initial hop limit field value of a mobility option and a current hop limit field value in an IP v6 header when a packet has arrived from a MN at a destination address or an anchor access router that will calculate the hop count. Thereafter, the RAP informs the MN of the calculated hop count.

Finally, reference numerals 204, 214 and 224 denote processes in which a MN calculates a hop count using an initial hop limit value, or using distance data acquired from an anchor access router. More specifically, if a message of Table 2 plus Table 3 is received, an acknowledgement message corresponding thereto is generated and then transmitted. Such an acknowledgement message can be configured as illustrated in Table 4 below.

TABLE 4

| Payload protocol | Header Length | HM Type | Reserved |
|---|---|---|---|
| Checksum | | Sequence # | |
| Status | Reserved | Mobility Option | |

Table 4 defines a distance measurement acknowledgement message. The message of Table 4 is used by designating an acknowledgement packet for hop count measurement in a MH Type field of a mobility header. As stated above, the mobility header designates a value of a header to be received after the current packet (To Be Determined by Internet Assigned Numbers Authority (TBD by IANA)) and is used for binding creation or management-related messaging. In Table 4, a message format used for a distance measurement acknowledgement message is defined. Compared with the message of Table 2, the message of Table 4 further includes a Status field in order to indicate that the request is accepted by a receiving node. The Status field is an 8-bit unsigned integer. A sequence# field of a 16-bit unsigned integer is used by a MN to match a measurement request message with an outstanding request. As Mobility Option included in the last field of the message of Table 4, an initial hop limit option and a distance data option are used. A Reserved field is used later on.

In comparison, Table 4 is different from Table 2 only in that the Status field is used in place of the A field. However, a message transmitted with the Mobility Option field in Table 4 is transmitted along with the calculated hop count. That is, the Mobility Option is transmitted along with a value of Table 3 or Table 5.

TABLE 5

| | Type = 8 | Length = 1 |
|---|---|---|
| Distance data | | |

Table 5 defines a distance data option among mobility options. As illustrated in Table 1, the hop limit field is an 8-bit field included in an IP v6 basic header, and performs the same operation as an IP v4 TTL (Time-To-Live) field. In Table 5, a distance data option among mobility options is defined as a type-length-value (TLV) format. An Option Type field, serving as an 8-bit identifier, is used to represent distance data among the mobility options and its value is set to 8. An Option Length field, serving as an 8-bit unsigned integer, has an 8-bit (or 1-octet) value and represents a length of a distance data option. A distance value is stored as option data.

In addition, a destination node represents an access router, a correspondent node, or an anchor access router (or a regional anchor point). An embodiment of the present invention will be described based on the regional anchor point as a destination node.

A hop count is calculated by an RAP when a MN sends a distance measurement request to the RAP. This mobility option is used for a distance measurement acknowledgement message.

As described above, the distance data illustrated in Table 5 is transmitted along with its acknowledgement signal. Because the distance data is transmitted along with an associated acknowledgement signal in this way, a receiving node can calculate a hop count.

Figure 3:
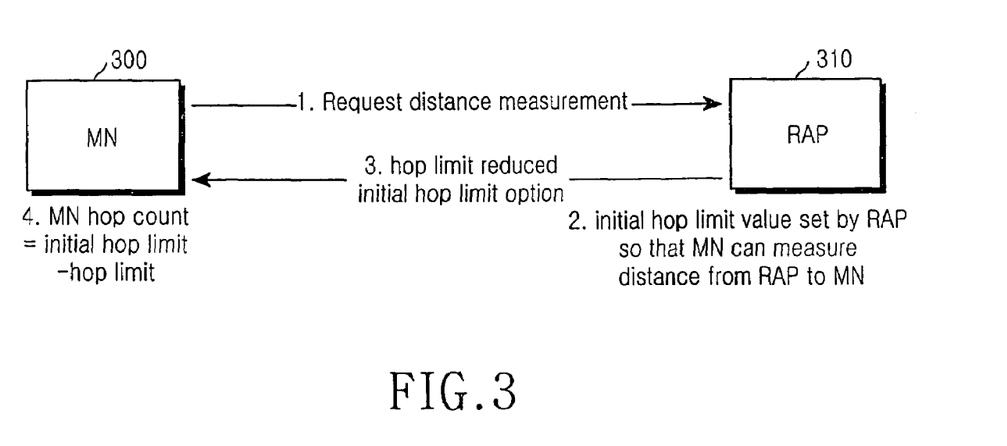
FIG. 3 is a flow diagram illustrating a process of calculating a hop count by a MN according to an embodiment of the present invention.
Figure 4:
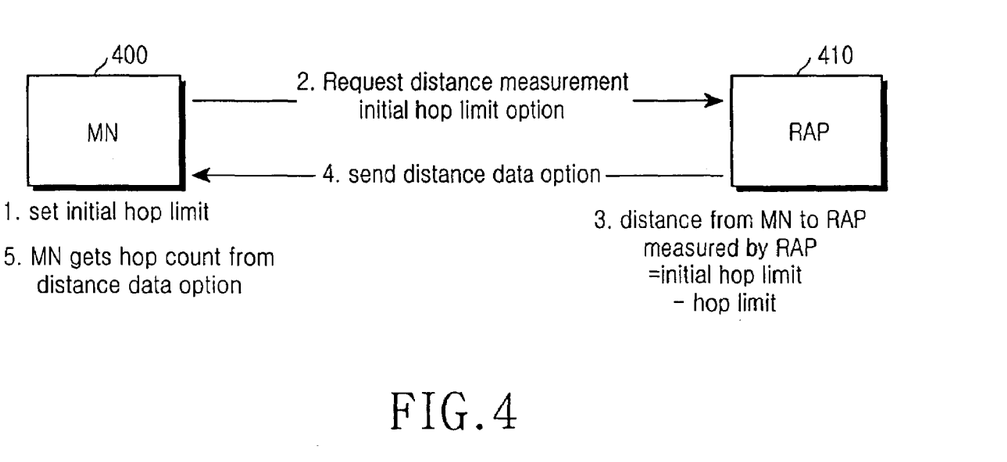
FIG. 4 is a flow diagram illustrating a process of calculating a hop count by an RAP according to another embodiment of the present invention.
Figure 5:
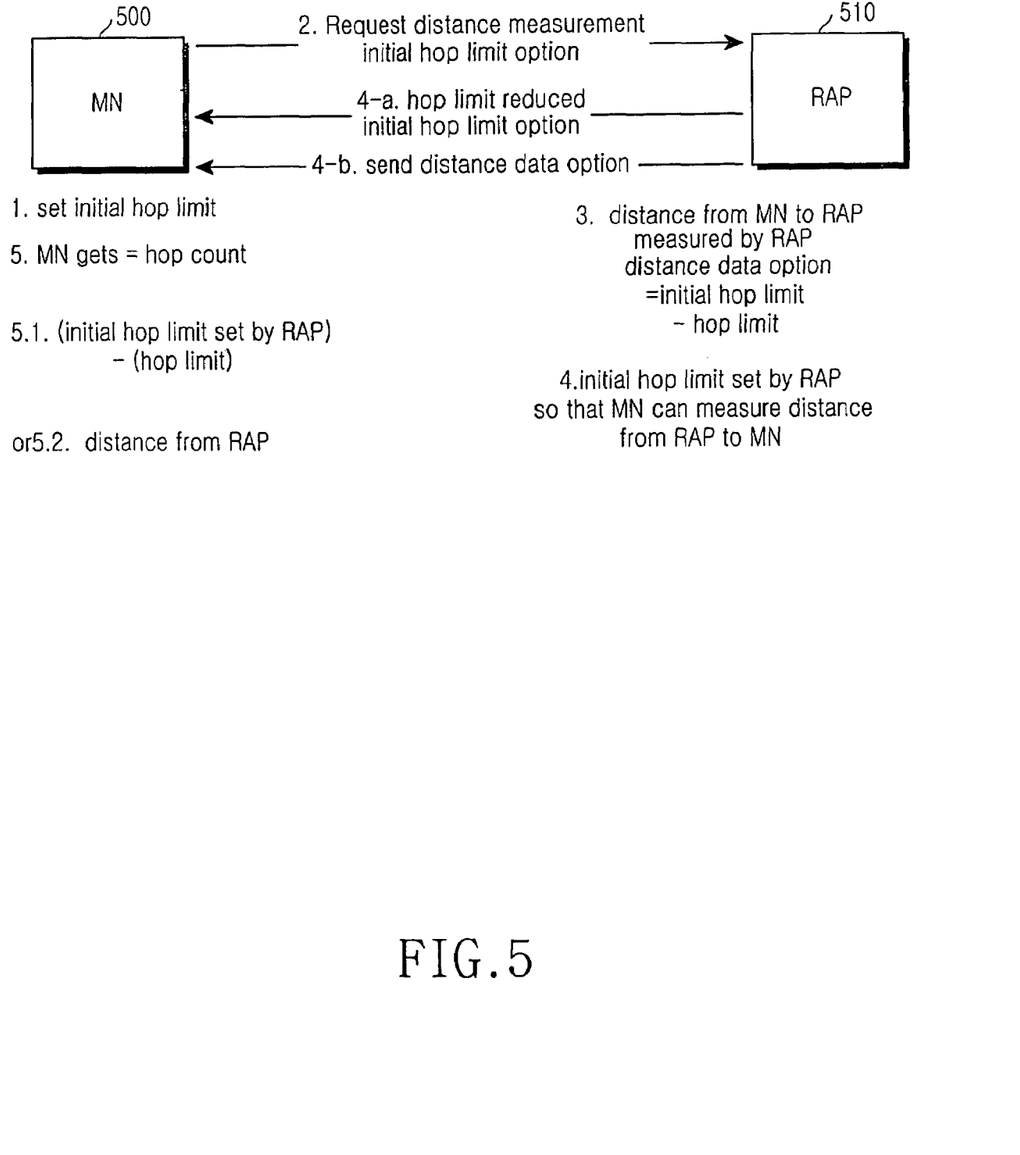
FIG. 5 is a flow diagram illustrating a hybrid process of the process of FIG. 3 and the process of FIG. 4 according to another embodiment of the present invention.

Such a measurement process will now be described in detail with reference to the annexed drawings. FIG. 3 is a flow diagram illustrating a process of calculating a hop count by a MN according to an embodiment of the present invention. FIG. 4 is a flow diagram illustrating a process of calculating a hop count by a RAP according to another embodiment of the present invention. FIG. 5 is a flow diagram illustrating a hybrid process of the process of FIG. 3 and the process of FIG. 4 according to further embodiment of the present invention.

Referring to FIG. 3, a MN 300 generates a request message of Table 2 including a field of Table 3 and delivers the generated request message to the RAP 310 in step 1. During such message transmission, a hop limit field value is not subjected to reduction. In step 2, the RAP 310 sets an initial hop limit value so that the MN can perform distance measurement using a message transmitted from the RAP to the MN. Thereafter, in step 3, the RAP 310 transmits an acknowledgement message, described in Table 4, to the MN 300. In this case, a hop limit field value being transmitted to the MN 300 is decreased by one each time it passes through a router. Then the MN 300 can calculate a hop count-from the value received in step 4. Because the initial value is constant, the MN 300 can calculate a hop count using a difference between the initial hop limit value and the value that has decreased each time it passed through a router.

Referring to FIG. 4, a MN 400 sets an initial hop limit value in step 1. Thereafter, in step 2, the MN 400 transmits a distance measurement request message, described in Table 2, to an RAP 410 along with a message described in Table 3. In this case, each time a packet is transmitted from the MN 400 to the RAP 410, a count value is decreased by one. In step 3, the RAP 410 can calculate a hop count from the MN 400 to the RAP 410 by detecting a difference between the initial hop limit value and a hop limit field value using the value received from the MN 400. After calculating a hop count in this way, in step 4 the RAP 410 generates an acknowledgement message, described in Table 4, including an option described in Table 5 and then transmits the generated acknowledgement message to the MN 400. Such calculation is performed using a hop count from the MN 400 to the RAP 410 and a hop count from the RAP 410 to the MN 400. Although these two paths are not identical to each other in length in an actual case, it can also be assumed that the two paths constitute a bi-directional path having the same length.

Referring to FIG. 5, a MN 500 sets an initial hop limit value in step 1. In step 2, the MN 500 delivers a distance measurement request message of Table 2 to a RAP 510. The message described in Table 2 includes a field described in Table 3. Upon receiving the distance measurement request message, in step 3 the RAP 510 measures a distance from the MN 500 to the RAP 510 in the method described in connection with FIG. 4. In step 4, the RAP 510 sets a hop count value in an acknowledgement message and transmits the acknowledgement message. At the same time, the RAP 510 sets initial hop limit information for calculating a hop count from the RAP 510 to the MN 500. Thereafter, in step 4-$a$, an initial hop limit option value is decreased each time it passes through a router. In addition, in step 4-$b$, a measured hop count from the MN 500 to the RAP 510 is transferred to the MN 500. Then in step 5, the MN 500 acquires a hop limit field value set by the RAP 510 and calculates a hop count from the RAP 510 to the MN 500. Alternatively, the MN 500 can acquire the hop count calculated and transmitted by the RAP 510. Such acquisitions can be simultaneously performed or only one of the acquisitions can be selectively performed. That is, the MN. 500 can acquire the distance from the MN 500 to the RAP 510 using both a distance data option and an initial hop limit option and also acquire the distance from the RAP 510 to the MN 500.

Figure 6:
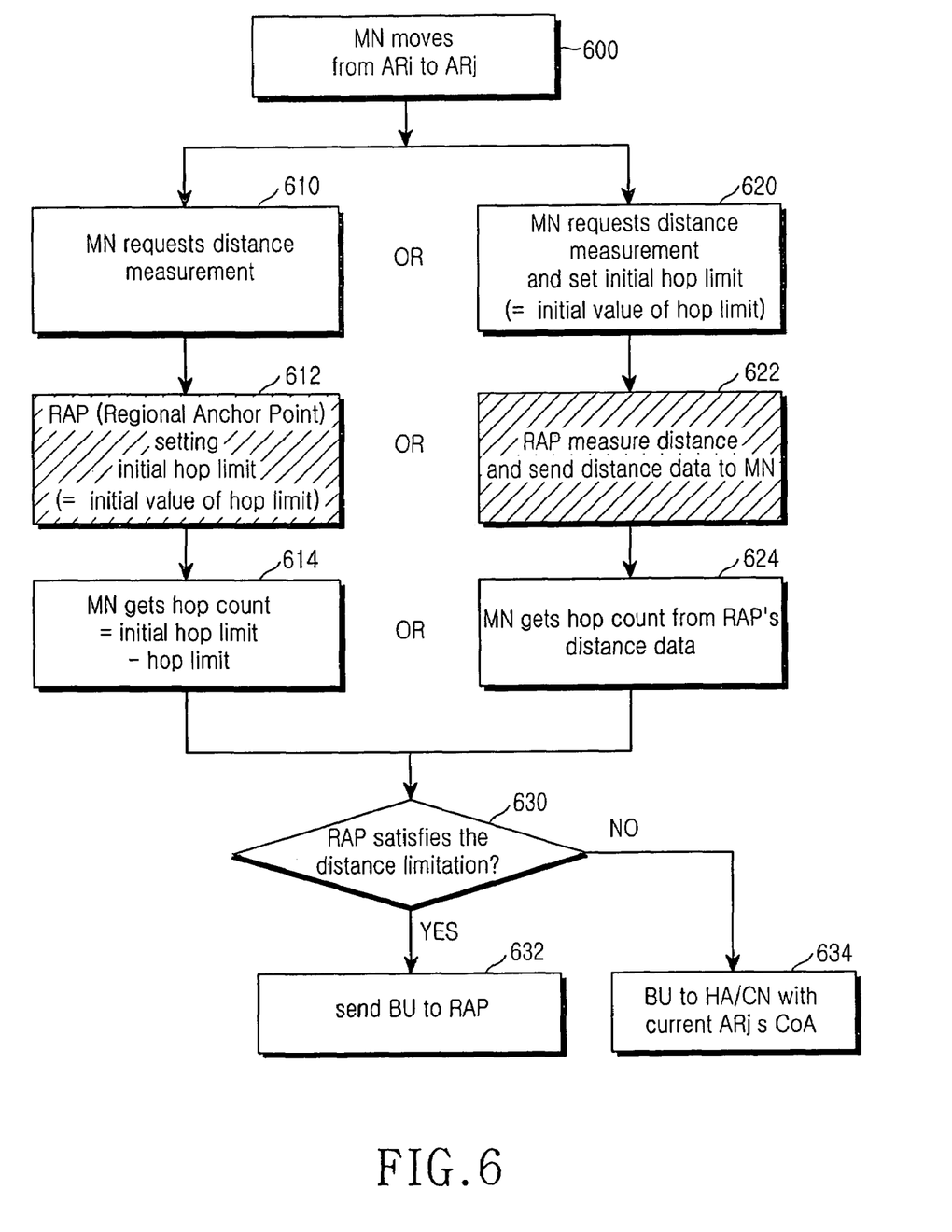
FIG. 6 is a flow diagram illustrating a hop count measurement process based on a Regional Mobile IP v6 (RMIP v6) according to an embodiment of the present invention.

FIG. 6 is a flow diagram illustrating a hop count measurement process based on Regional Mobile IP v6 (RMIP v6) according to an embodiment of the present invention. With reference to FIG. 6, a detailed description will now be made of a hop count measurement process based RMIP v6.

When a MN moves from an $i^{th}$ access router to a $j^{th}$ access router in step 600, a process of steps 610 to 614 or a process of steps 620 to 624 is performed. First, the process of steps 610 to 614 will be described. If the MN moves as stated in step 600, the MN generates in step 610 a distance measurement request message and transmits the generated message to a RAP. Such a message is transferred to the RAP via access routers. In step 612, the RAP sets an initial hop limit field value. The RAP sends the initial hop limit field value set in step 612 to the $j^{th}$ access router where the MN is located. Then the MN receives a hop limit field value via the $j^{th}$ access router. The hop limit field value is decreased each time it passes through a router. Therefore, the MN calculates a difference between the received hop limit field value and the initial hop limit value.

Next, the process of steps 620 to 624 will be described. If the MN moves to the $j^{th}$ access router in step 600, in step 620 the MN sets an initial hop limit field value, generates a distance measurement request message, and sends the generated distance measurement request message to the RAP. The hop limit field value set to an initial value is decreased by one each time it passes through an access router, thus having a different value from the initial hop limit field value. Upon receiving the distance measurement request message, the RAP can calculate a hop count from the MN to the RAP in step 622. After calculating a hop count, the RAP sends the calculated hop count along with a message shown in Table 4 to the $j^{th}$ access router where the MN is located. In this way, the MN can calculate a hop count from the MN to the RAP.

That is, the process of steps 610 to 614 is performed according to the process described with reference to FIG. 3, while the process of steps 620 to 624 is performed according to the process described with reference to FIG. 4. Therefore, the processes can be used as the hybrid process illustrated in FIG. 5 or both of the processes can be used individually.

If the step 614 or step 624 are performed individually or if both the steps 614 and 624 are performed, in step 630 the MN determines whether a distance up to the RAP satisfies a distance limitation condition. At this point, the actually important distance is a distance from the RAP to the MN. However, because a distance from the RAP to the MN is commonly identical to a distance from the MN to the RAP as stated above, one of the two processes can be selectively performed. Alternatively, both of the two paths can be measured. In this case, both the distance from the RAP to the MN and the distance from the MN to the RAP can be measured in the step 630.

If it is determined in step 630 that the distance from the RAP to the MN satisfies the distance limitation condition, in step 632 the MN sends a binding update (BU) message to the RAP. However, if it is determined in step 630 that the distance from the RAP to the MN does not satisfy the distance limitation condition, the MN sends in step 634 a binding update message to a home agent (HA) or a correspondent node (CN) using a Care-of-Address (CoA) acquired from the current access router (ARj).

Figure 7:
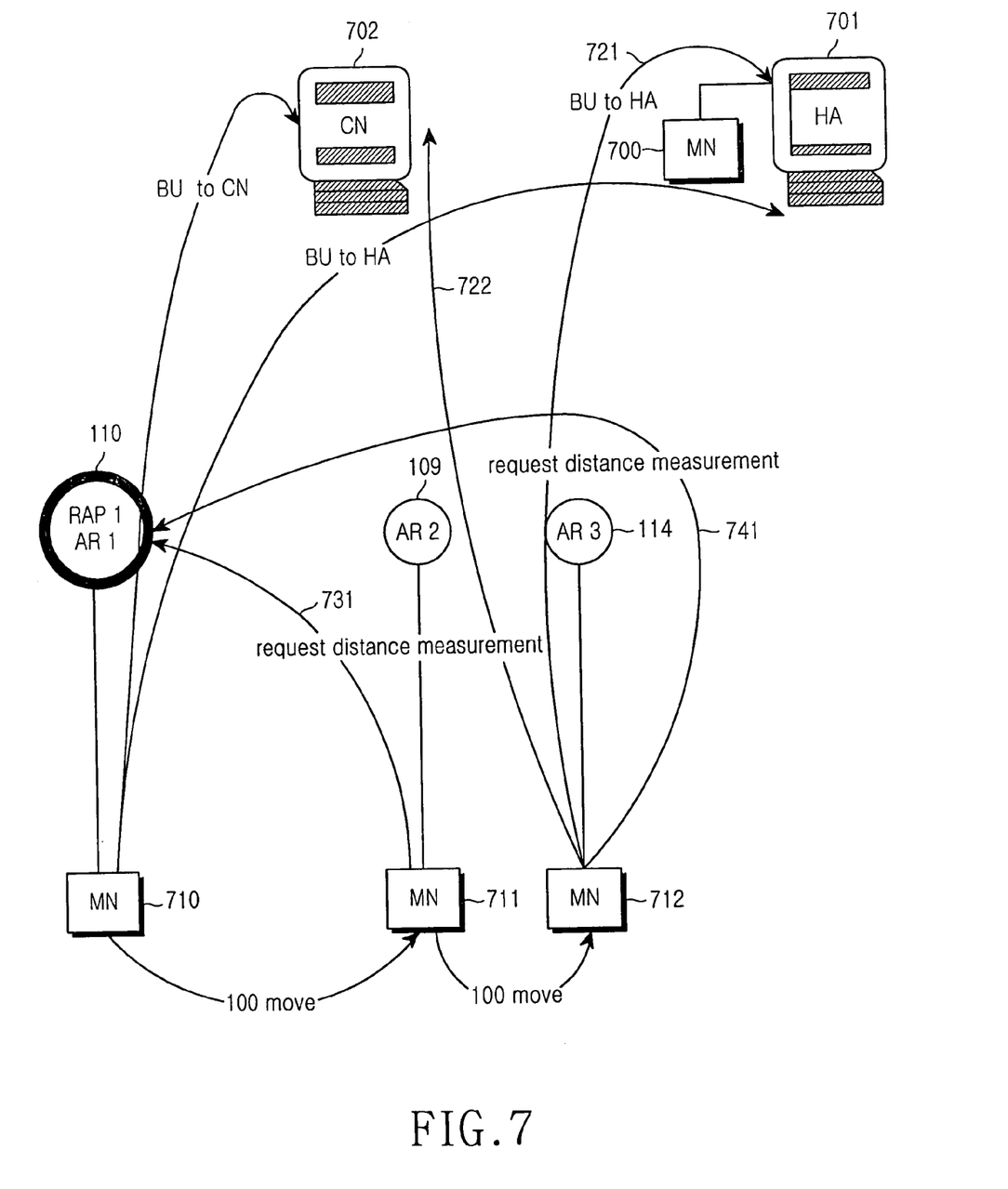
FIG. 7 is a signaling diagram illustrating a RMIP v6-based distance measurement method in the network topology of FIG. 1 according to an embodiment of the present invention.

FIG. 7 is a signaling diagram illustrating an RMIP v6-based distance measurement method in the network topology of FIG. 1 according to an embodiment of the present invention. With reference to FIG. 7, a detailed description will now be made of an RMIP v6-based distance measurement method in the network topology of FIG. 1.

It will be assumed herein that in the network topology, a first access router (AR1) 110 serves as a RAP. In addition, it is assumed that a distance limit between two ARs that can use a previous access router as an RAP is 3 hops. A distance is measured using the method proposed in the present invention and based on the measured distance, a MN determines to which node it will send a binding update message. If the MN moves to the position 710, it generates a BU message and sends the generated binding update message to an HA 701. Also, the MN generates a binding update message and sends the generated binding update message to a CN 702. At this point, because the MN is in communication with the AR1 110, the MN sends the binding update messages to the HA 701 and the CN 702 via the. AR1 110. A description will now be made of an operation performed when the MN moves from the position 710 to the position 711.

In FIG. 7, a distance between the AR1 110 and an AR2 109, as shown in FIG. 1, becomes one hop. Therefore, the AR2 109 can use the AR1 110 as an RAP. Meanwhile, a distance between an AR3 114 and the AR1 110, as shown in FIG. 1, becomes 4 hops. Therefore, the AR3 114 cannot use the AR1 110 as a RAP, and as commonly defined in MIP v6, the MN sends a binding update message to the HA 701 as shown by reference numeral 721, and also sends a binding update message to the CN 702 as shown by reference numeral 722.

The description will now be made in more detail. It is assumed that the MN moved from the position 700 to the position 710, which is the position (or a service area) of the AR1 110 serving as a RAP, and thereafter, performed a registration procedure in the above-stated method. In addition, it is assumed that the MN is in communication with the CN 702. In this case, if the MN moves to another position, for example, the position 711, the MN must measure a corresponding distance in the method described in connection with FIG. 3, FIG. 4, or FIG. 5. Therefore, the MN transmits a distance measurement request message to the AR1 110 serving as a RAP as shown by reference numeral 731. Such a message is transferred from the MN to the AR1 110 via the AR2 109. Because a distance between the AR1 110 and the AR2 109 is 1 hop as shown in FIG. 1, the distance does not violate the distance limitation. Thus, the MN can use the AR1 110 as a RAP even while it is in communication with the AR2 109. Therefore, the MN sends a binding update message to the RAP.

However, if the MN moves again to the position 712, the MN generates a distance measurement request message and transmits the generated distance measurement request message as shown by reference numeral 741. Because the MN has moved to the position of the AR3 114, the MN transmits the distance measurement request message to the AR3 114. Upon receiving the distance measurement request message, the AR3 114 delivers the distance measurement request message to the AR1 110 via other ARs 111, 112 and 113 of FIG. 1. Even in this case, distance measurement is performed in the method described in conjunction with FIG. 3, FIG. 4, or FIG. 5. In this case, a distance between the AR3 114 and the AR1 110 is 4 hops, the distance violates the distance limitation. Therefore, the MN sends binding update messages to the CN 702 and the HA 701.

Figure 8:
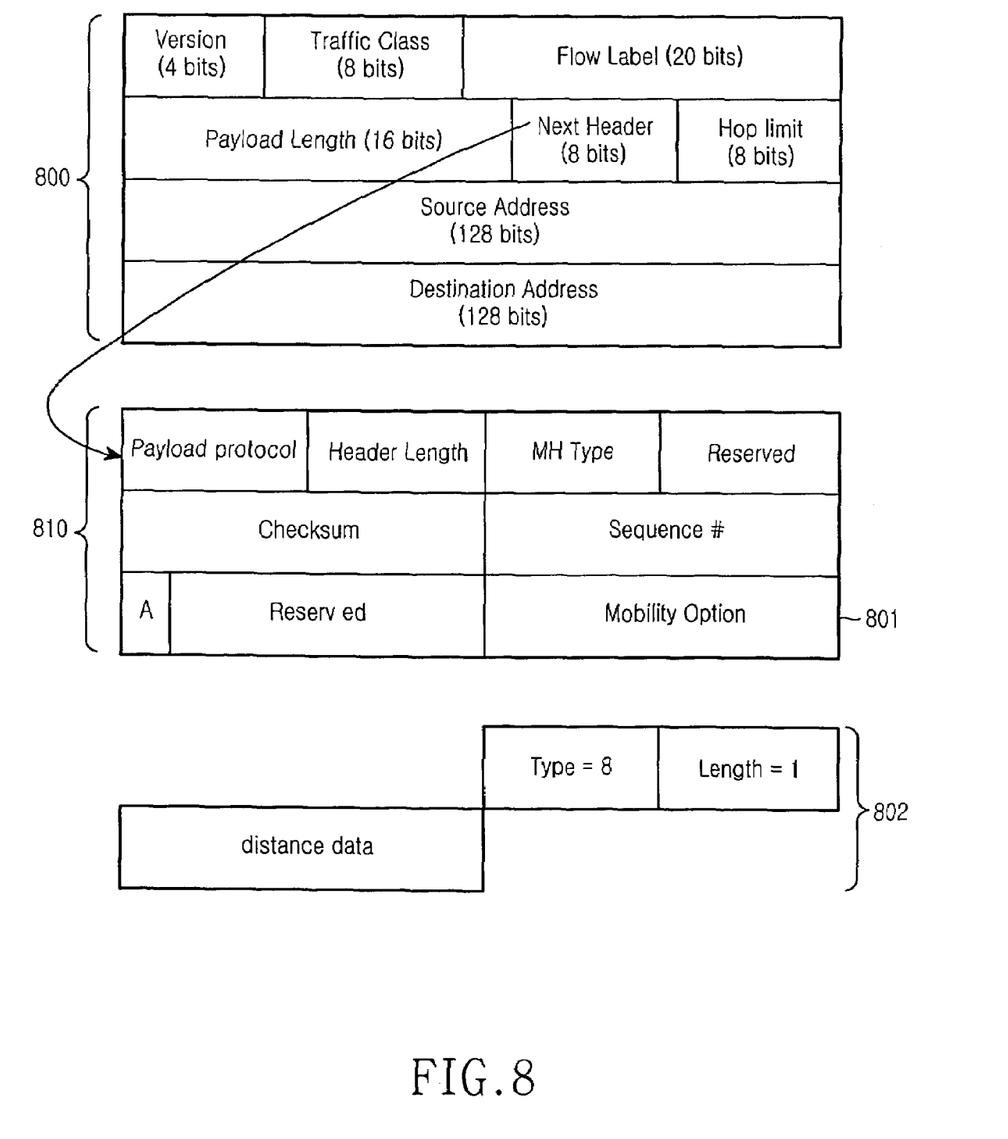
FIG. 8 is a diagram illustrating a relationship between an IP v6 basic header, a mobility header, and a mobility option.

FIG. 8 is a diagram illustrating relations between an IP v6 basic header, a mobility header, and a mobility option. With reference to FIG. 8, a detailed description will now be made of relations between an IP v6 basic header, a mobility header, and a mobility option.

In other words, FIG. 8 illustrates relations between message headers described in Table 1, Table 2, Table 3, and Table 5. In FIG. 8, reference numeral 800 denotes a message header described in Table 1, reference numeral 801 denotes a message header described in Table 2, reference numeral 802*a* denotes a message header described in Table 3, and reference numeral 802*b* denotes a message header described in Table 5. The relations between the headers will be described herein below.

A hop limit field included in the IP v6 basic header is used for distance measurement and an IP v6 extension header is pointed by a next header field. A mobility header is also a kind of the extension header. FIG. 8 shows how an initial hop limit field among the mobility options is connected. In FIG. 8, a mobility option field denoted by reference numeral 801 is replaced with an actual mobility option denoted by reference numeral 802*a* or 802*b*.

As described above, the present invention calculates a routing cost using a low-cost path, reducing a delay. In addition, the present invention accurately calculates a hop count, so as to prevent a MN from failing to perform communication or transitioning to an unstable state. Furthermore, the new method contributes to efficient management on regional mobility.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for calculating a cost of a mobile node (MN) in an Internet Protocol (IP) network communicating with the MN having a mobile IP and including a plurality of access routers, the method comprising the steps of:
   if the MN moves to a new access router, generating by the MN a distance measurement request message including an initial hop limit field value and a hop limit value and transmitting to an access router serving as a regional anchor point (RAP) of the MN the generated distance measurement request message;
   upon receiving the distance measurement request message, calculating, by the access router serving as the RAP, a hop count using the initial hop limit field value and the hop limit value, and sending to the MN as an acknowledgement signal the calculated hop count; and
   generating by the MN a binding update message and sending to a correspondent node and a home agent the generating binding update message, if it is determined from the hop count that a distance between the new access router and the RAP exceeds a distance limitation.

2. The method of claim 1, further comprising the step of decreasing the hop limit value included in the distance measurement request message by each of the plurality of access routers constituting the IP network each time each of the plurality of access routers receives the distance measurement request message and then delivers to a next node the distance measurement request message.

3. The method of claim 1, wherein the MN maintains a previous RAP if the hop count does not exceed a distance limitation.

4. The method of claim 1, wherein the hop count is calculated using a difference between the initial hop limit field value and the hop limit value.

5. The method of claim 1, wherein if the MN moves to the new access router, the MN sends the distance measurement request message to the access router serving as the RAP of the MN.

6. A method for calculating a cost of a mobile node (MN) in an Internet Protocol (IP) network communicating with the MN having a mobile IP and including a plurality of access routers, the method comprising the steps of:
   if the MN moves to a new access router generating by the MN a distance measurement request message and transmitting to an access router serving as a regional anchor point (RAP) of the MN the generated distance measurement request message;
   upon receiving the distance measurement request message, generating, by the access router serving as the RAP, an acknowledgement message having an initial hop limit field value and a hop limit value, and transmitting the acknowledgement message;
   calculating by the MN a hop count using the initial hop limit field value and the hop limit value; and
   generating by the MN a binding update message and delivering to a correspondent node and a home agent the generating binding update message, if a distance between an access router in which the MN is located and the access router serving as the RAP of the MN exceeds a distance limitation.

7. The method of claim 6, further comprising the step of decreasing the hop limit value by each of the plurality of access routers in the IP network each time each of the plurality of access routers sends the acknowledgement message to a next node.

8. The method of claim 6, wherein the hop count is calculated using a difference between the initial hop limit field value and the hop limit value.

9. The method of claim 6, wherein if the MN moves to the new access router, the MN sends the distance measurement request message to the access router serving as the RAP of the MN.

10. The method of claim 6, wherein the MN maintains a previous RAP if the hop count does not exceed a distance limitation.

11. A method for calculating a cost of a mobile node (MN) in an Internet Protocol (IP) network communicating with the MN having a mobile IP and including a plurality of access routers, the method comprising the steps of:
    if the MN moves to a new access router, generating by the MN a distance measurement request message including an initial hop limit field value and a hop limit value and transmitting to an access router serving as a regional anchor point (RAP) of the MN the generated distance measurement request message;
    upon receiving the distance measurement request message, calculating, by the access router serving as the RAP, a hop count using the initial hop limit field value and the hop limit value, and delivering to the MN the calculated hop count as an acknowledgement signal;
    upon receiving the distance measurement request message, generating, by the access router serving as the RAP, a distance measurement message including an initial hop limit field value and a hop limit value, and transmitting the generated distance measurement message;
    calculating by the MN a hop count using the initial hop limit field value and the hop limit value, and receiving a measured hop count from the access router serving as the RAP; and
    generating by the MN a binding update message and sending to a correspondent node and a home agent the generating binding update message, if a distance between an access router in which the MN is located and the access router serving as the RAP of the MN exceeds the hop limit value.

12. The method of claim 11, further comprising the step of decreasing the hop count by each of the plurality of access routers in the IP network, each time each of the plurality of access routers delivers the distance measurement request message to a next node.

13. The method of claim 11, further comprising the step of decreasing the hop count by each of the plurality of access routers in the IP network each time each of the plurality of access routers delivers the distance measurement message to a next node.

14. The method of claim 11, wherein if the MN moves to the new access router, the MN sends the distance measurement request message to the access router serving as the RAP of the MN.

15. The method of claim 11, wherein the MN maintains a previous RAP if the hop count does not exceed a distance limitation.

16. The method of claim 11, wherein the hop count is calculated using a difference between the initial hop limit field value and the hop limit value by the MN and the access router serving as the RAP of the MN.

17. A method for calculating a cost by a mobile node (MN) in an Internet Protocol (IP) network communicating with the MN having a mobile IP and including a plurality of access routers, the method comprising the steps of:

if the MN moves to a new access router, generating a distance measurement request message including an initial hop limit field value and a hop limit value and transmitting the generated distance measurement request message to a regional anchor point (RAP) of the MN;

receiving an acknowledgement message including a distance value from the RAP in response to the distance measurement request message; and     if the distance value exceeds a predetermined distance limitation, generating a binding update signal and sending the binding update signal to a correspondent node and a home agent.

18. A method for calculating a cost by a mobile node (MN) in an Internet Protocol (IP) network communicating with the MN having a mobile IP and including a plurality of access routers, the method comprising the steps of:

generating a distance measurement request message and transmitting the generated distance measurement request message to a regional anchor point (RAP);

upon receiving an acknowledgement message including, an initial hop limit field value and a hop limit value from the RAP, calculating a hop count using the initial hop limit field value and the hop limit value; and     if the hop count exceeds a predetermined distance limitation, generating a binding update signal and sending the binding update signal to a correspondent node and a home agent.

\* \* \* \* \*